(12) United States Patent
Taub et al.

(10) Patent No.: US 11,315,588 B2
(45) Date of Patent: Apr. 26, 2022

(54) COMMUNICATION SYSTEM FOR PROCESSING AUDIO INPUT WITH VISUAL DISPLAY

(71) Applicants: Robert Taub, Buckland Monachorum (GB); Lawrence Welkowitz, Keene, NH (US)

(72) Inventors: Robert Taub, Buckland Monachorum (GB); Lawrence Welkowitz, Keene, NH (US)

(*) Notice: Subject to any disclaimer, the term of this patent is extended or adjusted under 35 U.S.C. 154(b) by 0 days.

(21) Appl. No.: 16/156,156

(22) Filed: Oct. 10, 2018

(65) Prior Publication Data

US 2020/0227066 A1   Jul. 16, 2020

(51) Int. Cl.
| | | |
|---|---|---|
| *G10L 21/10* | (2013.01) | |
| *G10L 25/72* | (2013.01) | |
| *G10L 25/75* | (2013.01) | |
| *G10L 15/22* | (2006.01) | |
| *G10L 25/15* | (2013.01) | |
| *G10L 21/06* | (2013.01) | |
| *G09B 17/00* | (2006.01) | |
| *G09B 21/00* | (2006.01) | |

(52) U.S. Cl.
CPC ............. *G10L 21/10* (2013.01); *G10L 15/22* (2013.01); *G10L 25/15* (2013.01); *G10L 25/72* (2013.01); *G10L 25/75* (2013.01); *G09B 17/00* (2013.01); *G09B 21/009* (2013.01); *G10L 2015/225* (2013.01); *G10L 2021/065* (2013.01)

(58) Field of Classification Search
CPC ........ G09B 17/00; G09B 21/009; G10L 21/10
See application file for complete search history.

(56) References Cited

U.S. PATENT DOCUMENTS

| 2005/0262989 A1* | 12/2005 | Franzblau | G09B 15/023 84/470 R |
| 2008/0271590 A1* | 11/2008 | Lemons | G09B 21/009 84/483.2 |

OTHER PUBLICATIONS

V. Zue, "The Use of Speech Knowledge in Automatic Speech Recognition," Proceedings of the IEEE, Nov. 1985. (Year: 1985).*

* cited by examiner

*Primary Examiner* — Feng-Tzer Tzeng (57) ABSTRACT

A reference acoustic input is processed into a quantization representation such that the quantization representation comprises acoustic components determined from the reference acoustic input, wherein the acoustic components comprise amplitude, rhythm, and pitch frequency of the reference acoustic input. A visual representation is generated that simultaneously depicts the acoustic components comprising amplitude, rhythm, and pitch frequency of the reference acoustic input. A user spoken input may be received and similarly processed and displayed.

20 Claims, 11 Drawing Sheets

COMMUNICATION SYSTEM FOR PROCESSING AUDIO INPUT WITH VISUAL DISPLAY

This application claims the benefit of U.S. Provisional Application Ser. No. 62/571,328 entitled "Communication System For Processing Audio Input With Visual Display", by Robert Taub and Lawrence Welkowitz, filed Oct. 12, 2017. Priority of the filing date is hereby claimed, and the disclosure of the Provisional Application is hereby incorporated by reference.

BACKGROUND

Prevalence rates of Autism Spectrum Disorder (ASD) are estimated to be 1 in 68 in the United States. See, e.g., Christensen, D. L., et al., (2016); Prevalence and Characteristics of Autism Spectrum Disorder Among Children Aged 8 Years—Autism and Developmental Disabilities Monitoring Network, 11 Sites, United States, 2012; MMWR Surveillance Summary, 65(SS-3), 1-23. More recently, the incidence rate has been determined to be 1 in 59 children. See Morbidity and Mortality Weekly Report (MMWR), Surveillance Summaries, Vol. 67, No. 6, Apr. 27, 2018, Centers for Disease Control (2018). A concerted effort is needed to understand the nature of its core symptoms. ASD is characterized by poor social reciprocity in the form of limited response (non-congruent lengths of speech) or inappropriate content (failure to follow the threads of conversation), as well as difficulties understanding emotional content (happy, sad, surprise), which are critical aspects of failure in social performance and communication. Endless loop social problems then result in which other people, referred to as conversational partners, tend to reject conversational opportunities with people diagnosed with autism, because of difficulties in connection. This social conversational rejection results in lost opportunities for practicing social behaviors, which in turn leads to chronic social isolation and further interruption in the development of adequate social skills.

Early studies in psycholinguistics demonstrated the importance of responding to certain non-content aspects of speech, including vocal intensity, length of pauses, length of vocalizations or utterances, pitch and rhythm. See, e.g., Jaffee, et al., "Rhythms of dialogue in infancy: Coordinated timing in development", in Monographs of the Society for Research in Child Development, 66(2), 1-149 (2001). Specifically, individuals who were best at matching or reproducing these patterns of sounds and silences (vocal congruence) were judged to be superior in interpersonal communication. See, e.g., Welkowitz, et al., "Conversational congruence as a criterion for socialization in children", in Child Development, 47(1): 269-272 (1976). In other words, it is important to examine not only how individuals speak (production) but also how they respond to words spoken by conversational partners (interpretation). Research on speech has shown that individuals with ASD exhibit difficulties in acoustical speech recognition and prosody. For example, Diehl & Paul (2012) found that children with ASD exhibited greater variability in pitch, particularly when expressing emphatic stress. This finding is reported in Diehl, J., & Paul, R., "Acoustic differences in the imitation of prosodic patterns in children with autistic spectrum disorders", in Research in Autism Spectrum Disorders, 6 (1), 123-134 (2012). The ASD group also showed longer duration in utterances, a sign that they were pacing conversation differently compared to typically developing children. Communication abilities of persons diagnosed with ASD could be increased with techniques that help such persons understand the effect of their communications on others.

SUMMARY

In accordance with embodiments of the invention, a reference acoustic input comprising a spoken phrase is processed into a quantization representation such that the quantization representation comprises acoustic components determined from the reference acoustic input, wherein the acoustic components comprise amplitude, rhythm, and pitch frequency of the reference acoustic input; and a visual representation is generated that simultaneously depicts the acoustic components comprising amplitude, rhythm, and pitch frequency of the reference acoustic input. In one embodiment, a communication system is provided for processing audio input spoken by a test subject, a user of the device. The spoken reference acoustic input comprises a known phrase that is displayed to a user, who then speaks the phrase out loud such that the user spoken phrase is received by the device.

Other features and advantages of the present invention should be apparent from the following description of the preferred embodiments, which illustrate, by way of example, the principles of the invention.

BRIEF DESCRIPTION OF THE DRAWINGS

FIG. 5 illustrates data from the spoken input of FIG. 2 as saved for future study and analysis.

DETAILED DESCRIPTION

Disclosed herein is a hand-held device and a software program that can be executed on the hand-held device to help persons diagnosed with ASD to understand the effect of their speech communications on others, and to understand the speech communications of others. The hand-held device and software program may be used according to many different configurations. For example, the hand-held device may comprise a portable communications device, such as a smart phone or a tablet computer, and the software program may comprise an application installed on such a smart phone or tablet computer. Alternatively, the software program may be configured to operate on any device or system having a processor capable of performing the operations of the software program. Such devices or systems may comprise, for example, a laptop computer, a desktop computer, a distributed computing system such as a cloud-based computer system, a hand-held display device in conjunction with a companion processing device, and the like.

The software program described herein provides a means of representing parameters of speech, including volume, pacing, and emotional content. These parameters of speech may also be referred to herein as amplitude, rhythm, and pitch frequency, respectively. These parameters of speech may be represented in separate and independent strands in visual feedback on a device screen, and may be synchronous to audio (both processed audio and "live" acoustic audio).

The software program also calculates and provides scoring metrics (e.g., percentage match score) for user input speech relative to a reference line. The scoring includes a percentage match for each of the three independent strands of parameters of speech, as well an overall composite score. Data can be stored on device and/or in the cloud.

The ability to match other's speech patterns is typically present from early on in post-natal development. It has been observed that, from the earliest months, babies placed near each other not only babble but babble in turn. See, e.g., Oller, D. K. et al., "Infant babbling and speech", Journal of Child Language, 3 (01), 1-11 (1976). Linguistic analyses of babbling suggests that not only are babies engaging in turn-taking, but also communicating based on matching of various parameters of speech. See, e.g., Oller, D. K., & Eilers, R. E., "The Role of Audition in Infant Babbling", in Child Development, 59(2), 441-449 (1988). Challenges to opportunities for social exchange include hearing impairment (Stoel-Gammon, C., & Otomo, K., "Babbling development of hearing impaired and normally hearing subjects", in Journal of Speech and Hearing Disorders, 51, 33-41, (1986)), neurological problems affecting various brain regions (Holowka, S., & Petitto, L. A., "Left hemisphere cerebral specialization for babies while babbling", in Science, 297(5586), 1515-1515 (2002)), and even socio-economic variables (Ellers, R. E., et al., "The role of prematurity and socioeconomic status in the onset of canonical babbling in infants", in Infant Behavior and Development, 16(3), 297-315, (1993)). Regardless of the specific etiology, the critical point is that babies deprived of these early exchanges may fall out of developmental sequence, which in turn can blunt social conversational skill development and possibly the development of relevant neural pathways.

Intervention based on visual feedback of speech may be especially helpful for remediating the marked difficulties in inferring meaning from non-content aspects of speech and in vocal congruence in ASD, given that high level visual processing abilities is generally intact in the disorder (Tissot, C., & Evans, R., "Visual Teaching Strategies for Children with Autism", in Early Child Development and Care, 173 (4), 425-433 (2003)). A variety of studies suggest that a software program that uses a hand-held device (e.g., a tablet computer such as an "iPad") to provide immediate visual feedback regarding speech matching may be helpful. See, e.g., Benik, A., et al., "Pilot Study of an iPad Application for Autism: Follow-up on Generalizability", presented at the Annual Meeting of Eastern Psychological Association (March 2016); Githmark, D., & Welkowitz, L., "Effects of visual feedback of speech patterns on fluency of speech in Individuals with Autism Spectrum" in Mensa Research Journal, 40(3), 37-40 (2010); Kristiansen, A. R., & Welkowitz, L. A., "iPad based visual feedback of speech on conversational patterns in Autism", presented at Annual Meeting of Eastern Psychological Association, Boston, Mass. (March 2014); Welkowitz, L., & Green, J., "The effects of visual feedback of conversational patterns in Autism using iPad Application", presented at Annual Meeting of Eastern Psychological Association, New York, (March, 2013).

In accordance with the description herein, the software program provides immediate feedback to subjects regarding their ability to produce speech of their own to match sound waves with pitch, rhythm, volume and overall features that match corresponding features of a reference phrase. The software program will be referred to herein under the trade name of "SpeechMatch". The "SpeechMatch" software program is configured to be executable by a wide variety of processors operating in accordance with a variety of operating systems. For example, the "SpeechMatch" software program may execute on a worn device, such as a digital wristwatch or the like, or may operate on a smart phone, or tablet computer, or laptop computer, or desktop computer, or with a distributed processing configuration such as cloud computing or the like. When the software program executes on the device, subjects are asked to match pre-recorded phrases that reflect several emotional domains that have been studied extensively and which are viewed as distinct domains (see, e.g., Ekman, P., "Are There Basic Emotions?", Psychological Review, 99(3), 550-3 (1992)), including happy, sad, unpleasant surprise, and pleasant surprise.

Figure 1:
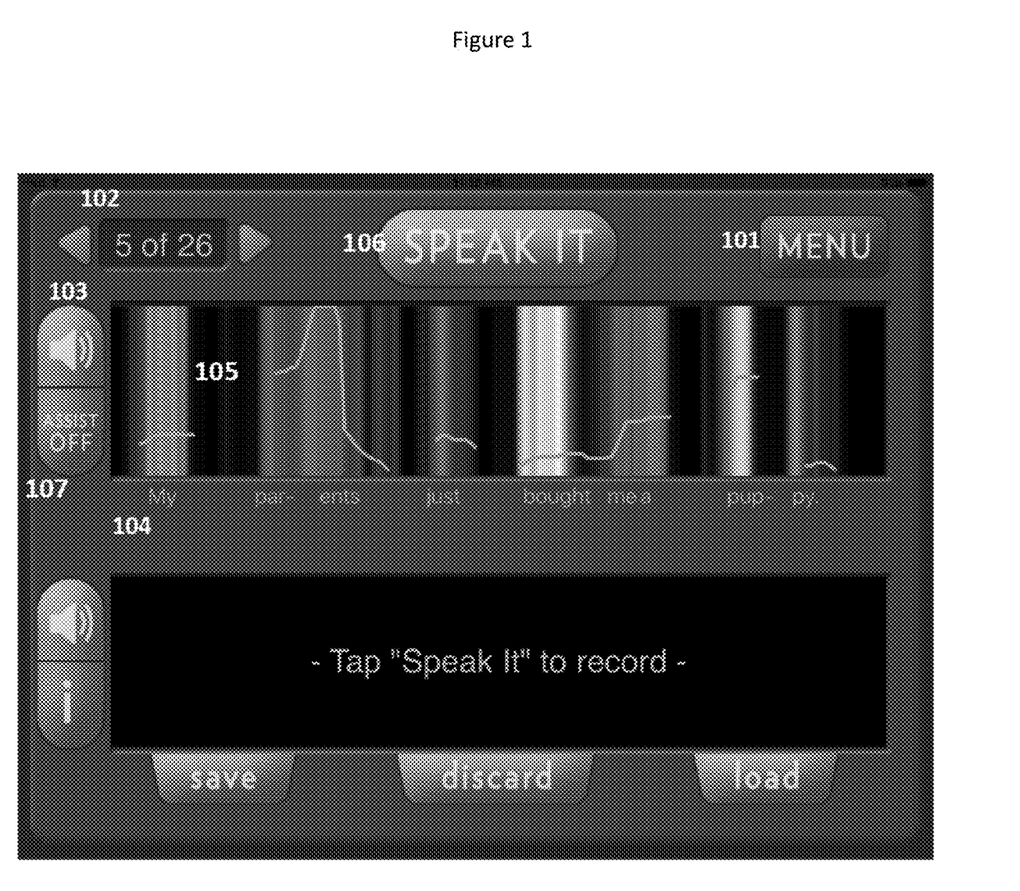
FIG. 1 illustrates a display of a device constructed in accordance with the invention, showing the display with visual feedback of a reference phrase.

FIG. 1 shows a display of a device 100 constructed in accordance with the invention, showing the display with visual feedback of a reference phrase. In FIG. 1, a user may touch the loudspeaker icon 103 shown on the display to hear a phrase and see associated visual feedback for the user's pronunciation of the phrase.

In FIG. 1, a user may select via a menu display button 101 a set of reference phrases from a library of programs, such as ASD phrases. The ASD phrases may comprise, for example, phrases from a library of programs. The display also shows that the user may select 102 the reference phrase from within a selected language program. The display loudspeaker icon 103 may be selected to hear the phrase and see associated visual feedback. The user may select the loudspeaker icon to hear a phrase and see associated visual feedback. The display includes a lower window 104 in which the reference phrase is shown. The lower display window 104 shows the syllables of the phrase aligned with the three parameters of speech that are being analyzed by the processing.

FIG. 1 shows the example phrase of "My parents just bought me a puppy." The visual feedback is shown in the display window 105, such that the solid wavy lines extending generally horizontally are frequency contours, with higher frequency values indicated by higher y-axis values, the white bars indicate magnitude of volume, so that a louder volume produces a greater intensity of white bars, and rhythm and pacing of speech is denoted along the x-axis of the display. In FIG. 1, a user may select the "Speak It" icon 106 to record his/her own vocalization of the phrase. The user will then receive real time visual feedback relative to the reference phrase. The "Assist" icon 107 may be selected to initiate play of reference phrase audio in the background while the user is speaking the spoken phrase and the spoken phrase is recorded.

Figure 7:
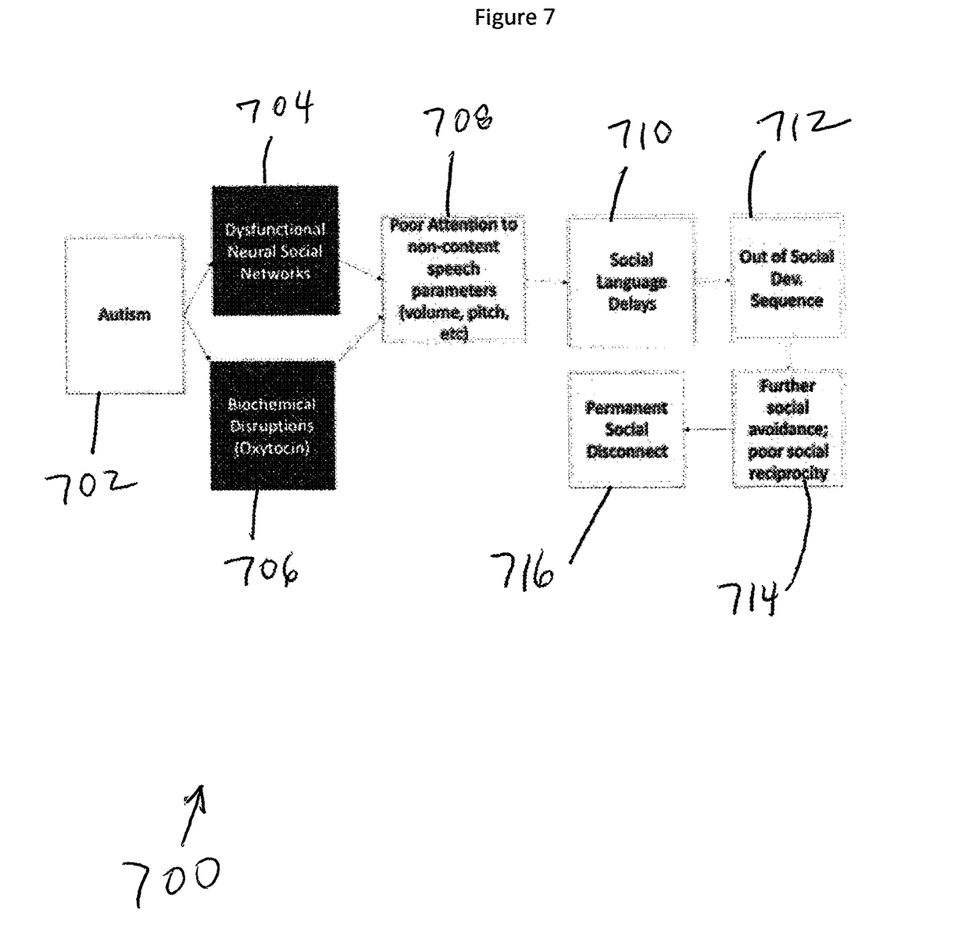
FIG. 7 is a diagram that illustrates the path of language impairments, such as autism, that lead to social isolation.

A more complete model for understanding the path of language delay in ASD is presented in the flow diagram of FIG. 7. The model for understanding the path of language delay in ASD presented in FIG. 7 is a model that acknowledges a fuller pathophysiology that includes both neural and biochemical predispositions that lead to lack of attention to critical non-content aspects of speech in ASD. Individuals with autism simply are not oriented toward the types of social cues that create perceptions of connection, including empathy, warmth, and genuineness, and as a result, children with ASD often fall out of the social developmental sequence. As a result, the goal becomes putting in place critical pivotal behaviors that will orient the person toward increased matching of a few speech parameters, rather than "correcting the path," since the literature indicates that those who are effective in matching have more social success. See, e.g., Crown, C. L., et al., "The cross-modal coordination of interpersonal timing: Six-week-olds infants' gaze with adults' vocal behavior", Journal of Psycholinguistic Research, 31(1), 1-23 (2002).

Figure 2:
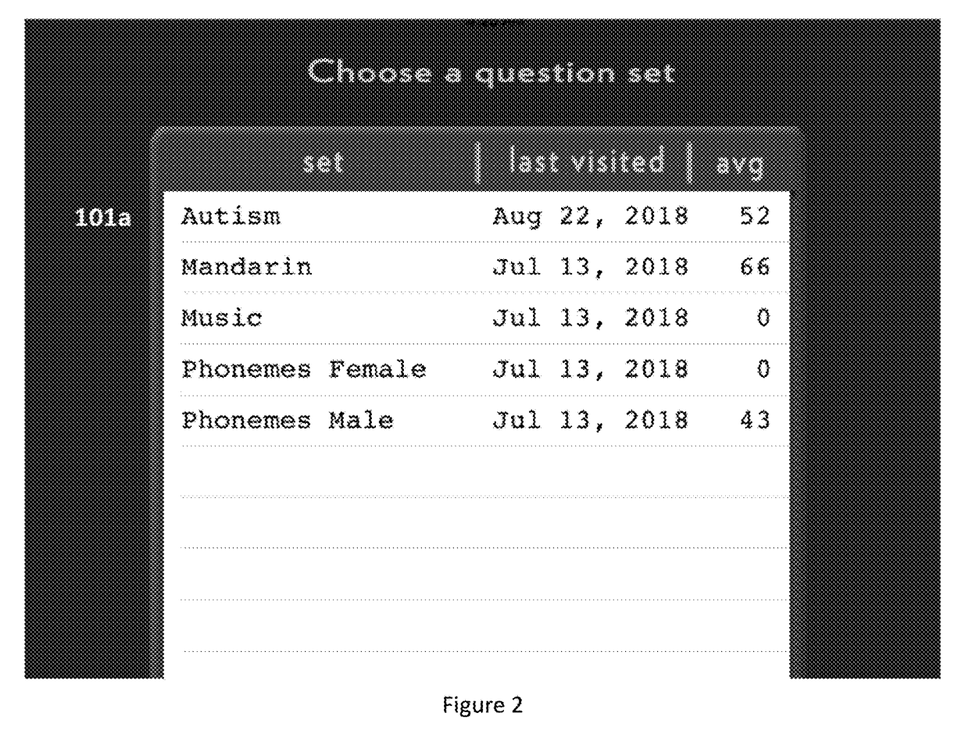
FIG. 2 shows sets of reference phrases available for selection by the user, as displayed upon selection of a FIG. 1 menu item by the user.

FIG. 2 shows sets of reference phrases 101a that are available for selection by the user. The sets of reference phrases 101a are displayed in a drop-down list upon selection of a corresponding item from the FIG. 1 menu button 101.

Figure 3:
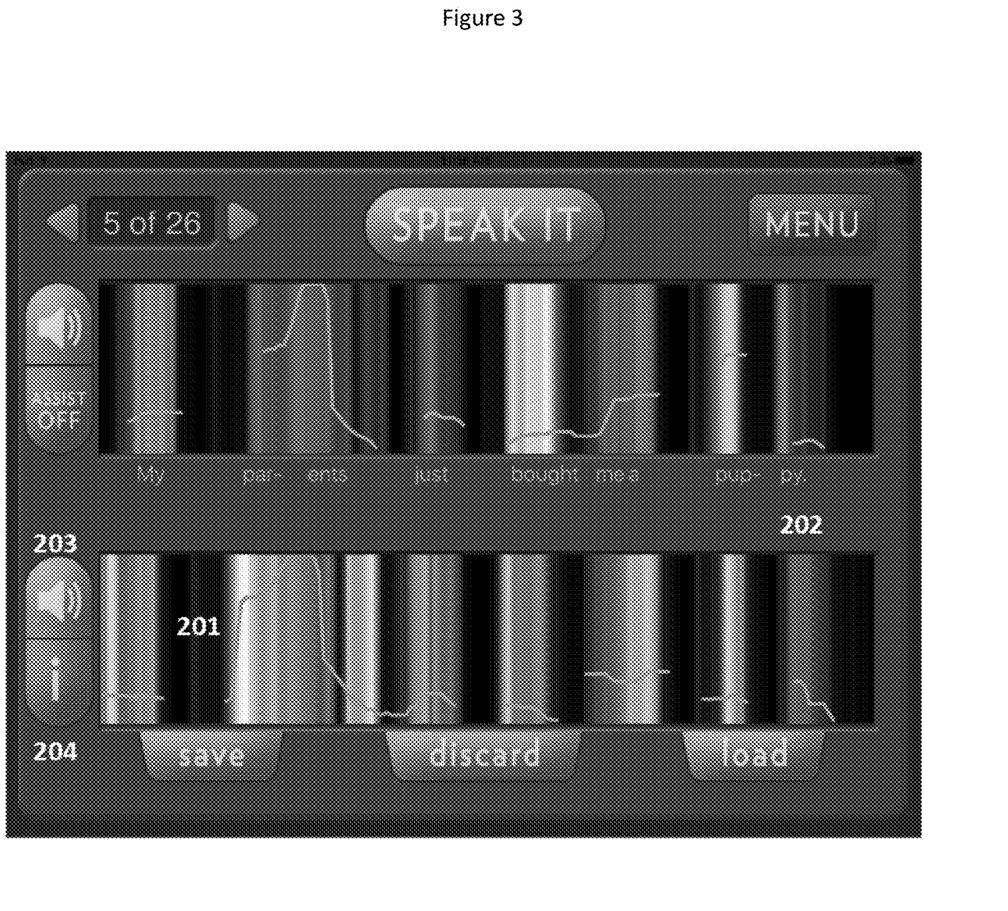
FIG. 3 illustrates a display of a device constructed in accordance with the invention, showing the display results of a subject speaking the phrase and receiving immediate visual feedback about the match of the user's spoken phrase relative to the reference phrase.

FIG. 3 illustrates a display 200 of a device constructed in accordance with the invention, showing the display results of a subject speaking the phrase and receiving immediate visual feedback about the match of the user's spoken phrase relative to the reference phrase.

In FIG. 3, a lower display window 201 shows that a user has spoken the phrase, and visual feedback is generated in real time as the user is speaking. An upper display window 202 shows a comparison of visual feedback from the reference phrase against the phrase as spoken by the user, such that the outcome of the comparison is immediately evident in the display 201. The user may select a loudspeaker icon 203 to hear a vocalization of the reference phrase by the user. That is, the user-generated version of the reference phrase will be output over a loudspeaker of the system device. An information icon 204 may be selected by the user to display the score of the user for individual spoken phrase parameters of volume, rhythm, and pitch frequency, and to display an overall average score for the user-spoken phrase.

Figure 4:
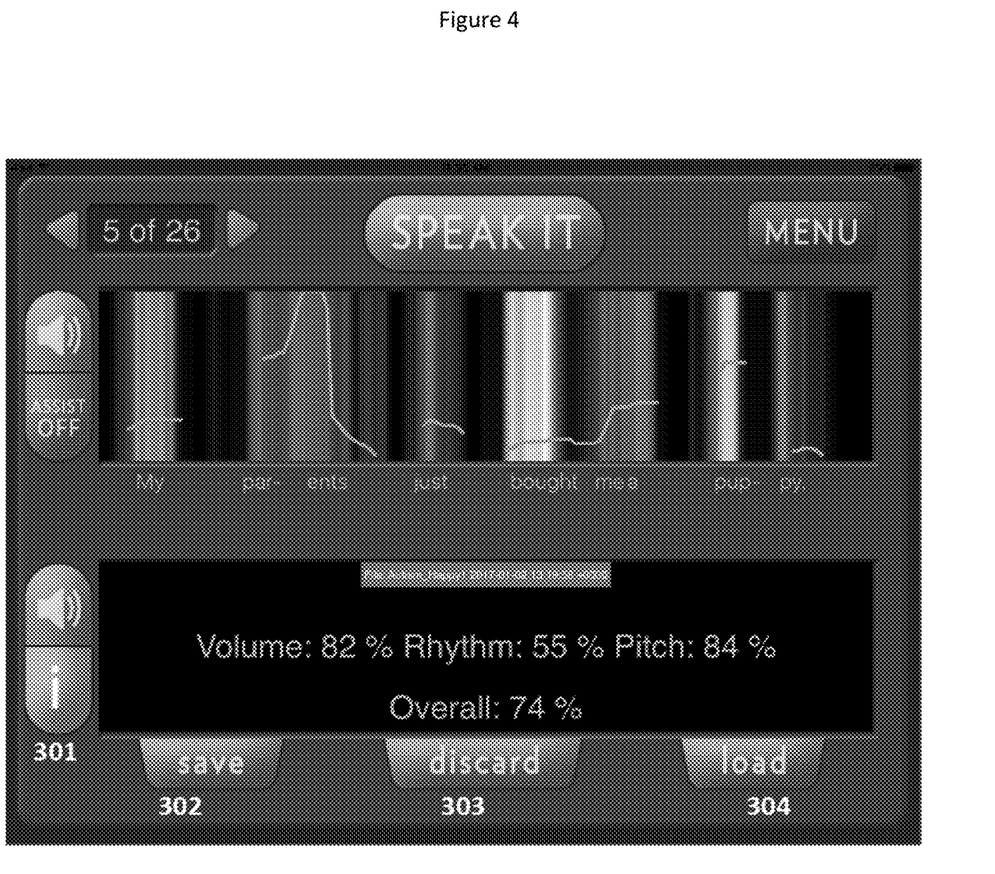
FIG. 4 illustrates the received scores for the subject speaking the phrases illustrated in FIGS. 1-3.

FIG. 4 illustrates the received scores for the subject speaking the phrases illustrated in FIGS. 1-3. In FIG. 4, the user may select the information icon 301 to initiate display of the user scores, as noted above in connection with FIG. 3. Selecting the "save" icon 302 enables saving the user's recording and associated metrics to data storage. Selecting the "discard" icon 303 deletes from data storage the user scores and metrics for the spoken phrase. Selecting the "store" icon 304 loads the user scores and metrics for the spoken phrase into the data storage. The data storage may comprise, for example, storage on the device and/or storage in an external facility, such as remote storage. In this FIG. 4 example, the user has received matching scores for the spoken phrase as follows: 82% for matching volume in the spoken phrase relative to the pre-recorded reference phrase, 55% for rhythm of the spoken phrase relative to the pre-recorded reference phrase, and 84% for pitch frequency of the spoken phrase relative to the pre-recorded reference phrase, with an overall (unweighted average) of 74% for match of the spoken phrase relative to the reference phrase.

The goal then, as with any chain of behaviors, is to intervene as early as possible and at the weakest point of the chain. Development of the techniques disclosed herein began by providing feedback interventions with adults with ASD and now we are doing studies with adolescents and, most recently, with pre-school aged children. Early intervention has been shown to be most effective in Autism, such as detailed in Lovaas, O. I., "Behavioral treatment and normal educational and intellectual functioning in young autistic children", in Journal of consulting and clinical psychology, 55(1), 3 (1987). The goal in such techniques is to improve social skills and ensuing social networks as early as possible in order to prevent permanent social alienation.

Figure 6:
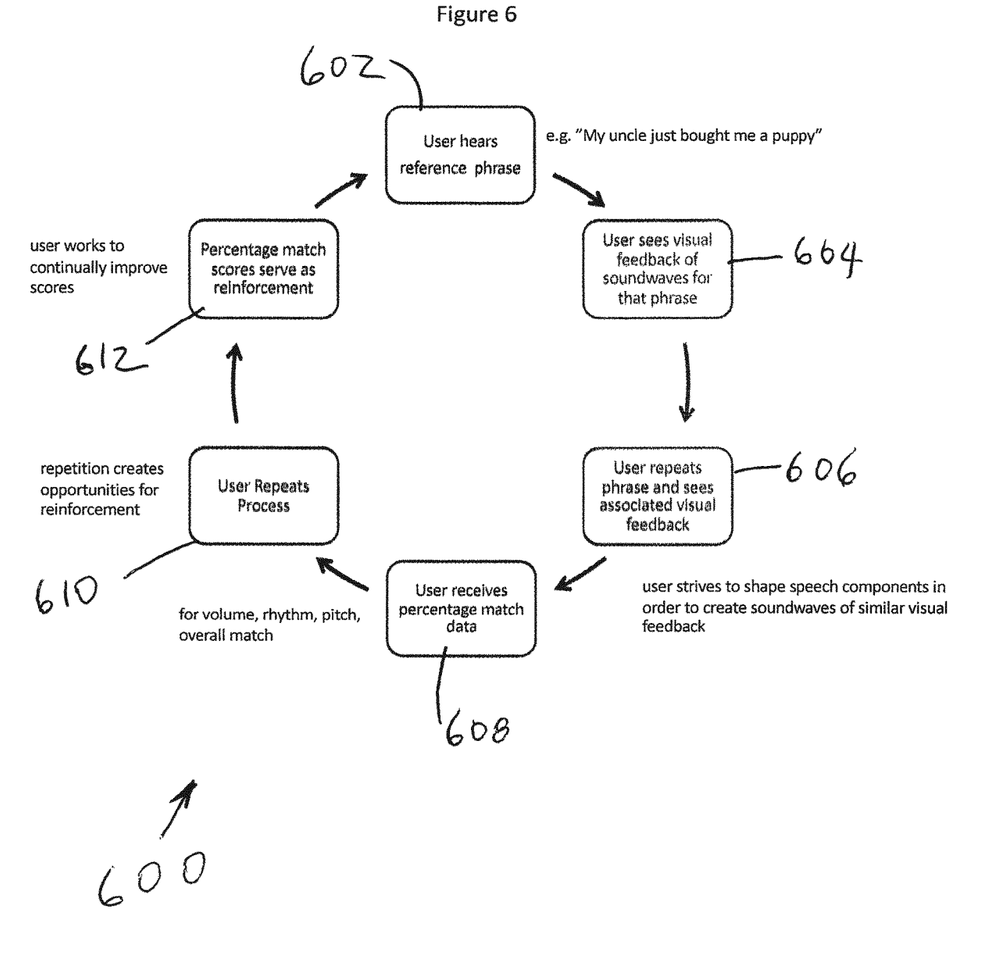
FIG. 6 is a diagram that illustrates the feedback loop supported by embodiments of the present invention.

FIG. 6 illustrates the timing of therapeutic intervention which is theorized to capitalize on possibilities of positive behavior change and ensuing neuroplastic changes in the form of new more efficient attentional neural networks. See, e.g., Schwartz, J. M., et al., "Systematic Changes in Cerebral Glucose Metabolic Rate After Successful Behavior Modification Treatment of Obsessive-Compulsive Disorder", in Archives of General Psychiatry, 53(2):109-113 (1996). Computer-assisted programs such as the disclosed "Speech-Match" program may help individuals with ASD identify important parameters of conversation (e.g., matching volume, rhythm) and experience the benefits of engaging in more pro-social behaviors.

FIG. 5 illustrates data from the spoken input of FIG. 2 as saved in a data table 401 for future study and analysis. The FIG. 5 table includes columns for: the subject (user) number in Column A; menu selection (e.g., Autism) in Column C; phrase selected in Column D; trial number in Column E; date in Column F; volume (loudness or magnitude) score in Column H; rhythm score in Column J; pitch score in Column L; and overall/average (unweighted) score in Column M.

FIG. 6 is a diagram that illustrates the feedback loop 600 supported by embodiments of the present invention. The feedback loop processing begins at the flow diagram box numbered 602, when the user or test subject hears a reference phrase. As with the FIG. 1 drawing, the reference phrase is depicted as "My uncle just bought me a puppy." In the next flow diagram box of FIG. 6, the box numbered 604, the user sees a visual feedback of sound waves corresponding to the reference phrase. This display of feedback is illustrated in FIG. 1. Next the user repeats the reference phrase and sees the associated visual feedback of the user's verbalization. This is illustrated in FIG. 3. Next, at the flow diagram box numbered 608, the user receives information regarding a comparison of the user's repeated phrase and the reference phrase that indicates the percentage match of the quantized user's verbalization as compared with the quantized reference phrase. In the system described herein, the percentage match data will provide a numerical comparison of the reference phrase and the user's verbalization according to the components of volume, rhythm, pitch frequency, and an overall match score. Next, at the flow diagram box numbered 610, the user repeats the process of verbalizing the reference phrase, and seeing the received data that indicates the percentage match. Repetition in this fashion has been found to be helpful in creating opportunities for reinforcement of correct verbalization. The next flow diagram box, numbered 612, notes that the repeated percentage match data provided to the user can serve as reinforcement for the verbalization learning, as the user works to continually improve the percentage match data scores. The process can be repeated for additional different reference phrases, as represented by the flow diagram box numbered 602.

FIG. 7 is a flow diagram 700 that illustrates the path of language impairments, such as autism, that lead to social isolation. The FIG. 7 diagram 700 provides a model for understanding the path of language delay in ASD. In FIG. 7, the left-most box numbered 702 represents an individual with the condition referred to as autism. As a result of the autism condition, the person may experience dysfunctional neural social networks 704 and may also experience biochemical disruptions 706, which may be treated with drug therapy such as with doses of oxytocin. From these two conditions 704, 706, this experience may lead to the behavior indicated by the box 708, comprising poor attention to non-content speech parameters. As noted herein, these non-content speech parameters may be modeled as the speech components of volume, pitch frequency, and rhythm, and the like. As a result of the poor attention to non-content speech parameters, the person may experience social language delays in understanding and responding, as represented by the box numbered 710. Next, at the box numbered 712, the person may experience being out of the typical social developmental sequence. This may lead to the experience indicated at box 714, further social avoidance behavior, and poor social reciprocity. Such behavior may then lead to a permanent social disconnect for the user, as indicated at the box numbered 716.

Figure 8:
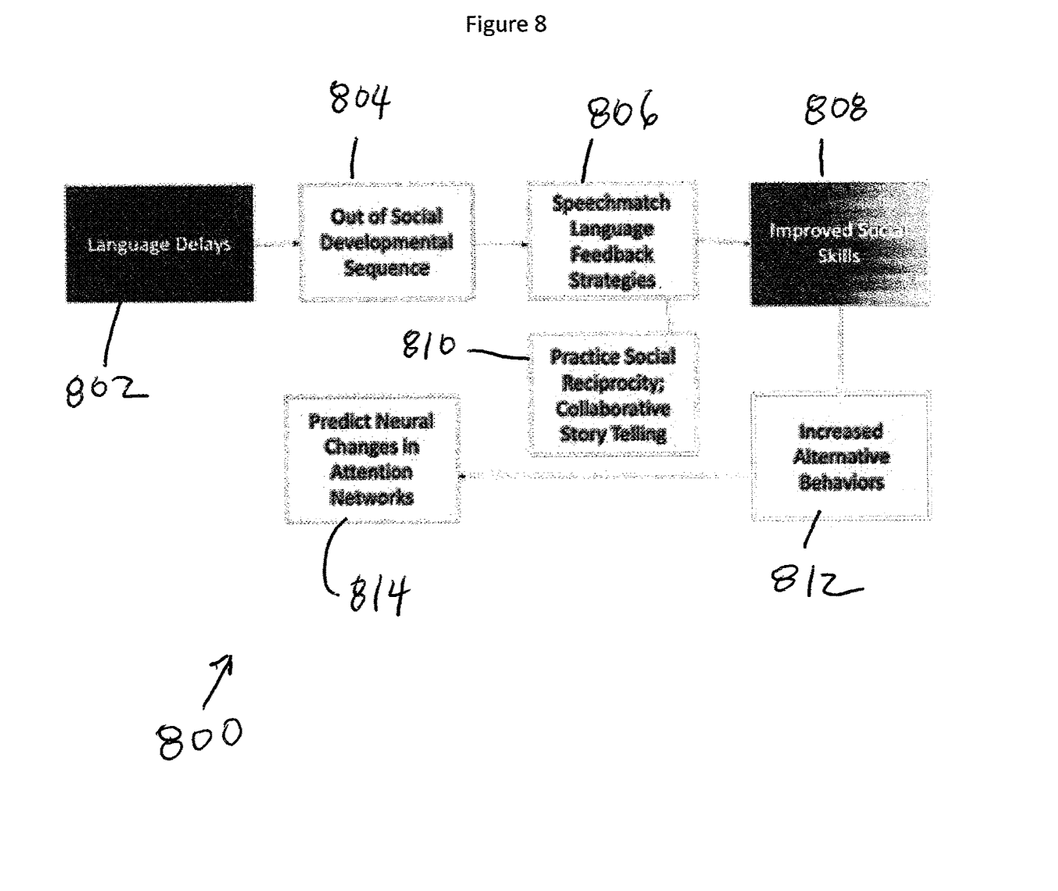
FIG. 8 is a diagram that illustrates how therapeutic interventions may be utilized to break the cycle of language impairments that lead to social isolation.

FIG. 8 is a flow diagram 800 that illustrates how therapeutic interventions in accordance with the disclosure herein may be utilized to break the cycle of language impairments that often lead to social isolation. The first box, numbered 802, indicates a person diagnosed with autism experiencing language delays. Because of the language delays 802, the person may experience an out-of-social-development sequence 804. The "SpeechMatch" technique described herein may then be utilized with its feedback strategies. As a result of the feedback strategies using the "SpeechMatch" processing described herein, the person should experience improved social skills, indicated by the flow diagram box numbered 808. The improved social skills are obtained in conjunction with the feedback strategies described herein, and provide an opportunity to practice social reciprocity and collaborative storytelling, as indicated by the box numbered 810. As a result of the improved social skills 808, the person is likely to experience increased alternative behaviors, such as improved social interaction. This improvement is indicated by the box numbered 812. A person experienced in language learning and therapies may observe the increased alternative behaviors 812 and as result may predict and observe neural changes in attention networks at 814.

Figure 9:
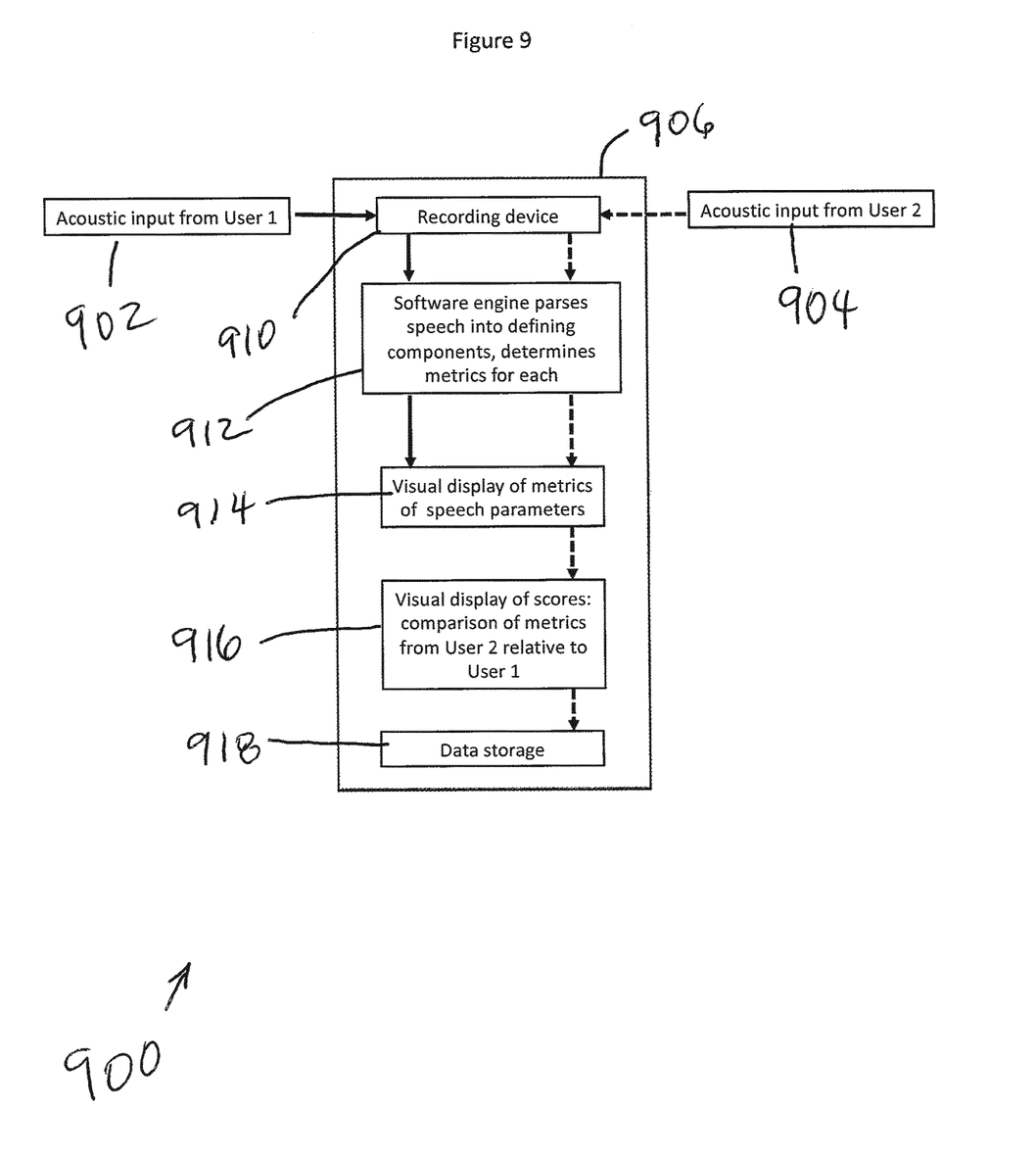
FIG. 9 is a flow diagram that illustrates processing in accordance with the disclosed system.

FIG. 9 is a flow diagram that illustrates processing in accordance with the disclosure. In FIG. 9, a system 900 is shown that performs analysis of acoustic input in accordance with the disclosure. A reference acoustic input is received from a reference source, identified in FIG. 9 as "User 1" 902. An acoustic input is received from a user, identified in FIG. 9 as "User 2" 904. Both inputs are processed in an analysis block 906. In the analysis block 906, the reference acoustic input 902 and the user acoustic input 904 are received at a recording device 910. The recording device 910 may comprise, for example, a handheld computing device employed by the user or may comprise an online data storage facility. The data representing the stored reference acoustic input and the user acoustic input are provided to a software engine block 912 that parses the received acoustic input into components. The analysis block 912 may also comprise determining metrics for each of the determined components.

At the box numbered 914, the visual display of the inputs may be provided. Moreover, the visual display may comprise a presentation of the determined metrics. In the processing block number 916, the visual display scores may indicate a comparison of the metrics. At the flow diagram box number 918, the data may be placed into data storage, such that the stored data indicates the component parameter values of the referenced acoustic input and of the user inputs and of the comparison.

A study (Githmark, supra) showed that free downloadable recording software programs, such as the software program called "Audacity", can be a useful tool in teaching individuals with ASD to match speech patterns. The therapist simply records a phrase that corresponds to some emotional valence (happy, sad, pleasant surprise, unpleasant surprise, neutral) and the client repeats the phrase while viewing the visual image of the sound wave generated by the program. The therapist provides subjective feedback about the degree of match observed, as the "Audacity" software program does not separate the three prime components of speech (volume, pacing or rhythm, and emotional content, represented by pitch frequency) into separate observable strands, nor does the software program provide any scoring metrics.

Other methods that encourage recognition of non-content aspects of speech may be encouraged including reviewing recordings of conversations (Behavioral Tests), collaborative story telling in which lengths of vocalizations are timed, and direct instruction in which clients are simply asked, for short periods of time, to focus on how long they speak, how long they pause, how loud they speak, and other aspects of prosody and matching. The techniques described herein separate the three prime components of speech (volume, pacing, emotional content) into separate observable strands for immediate visual feedback upon the subject user speaking phrases, and provides scoring metrics for each strand as well as for overall match. Thus, the software program can be used by subjects and students outside of therapy, while at home or in a setting that is informal and out of an office. The scoring metrics can be calculated, for example, by comparing time slices of the user input speech against corresponding time slices of the reference phrase, or by comparing portions of the user input speech to similar-shaped portions of the reference phrase in accordance with volume, pacing, and emotional content.

Figure 10:
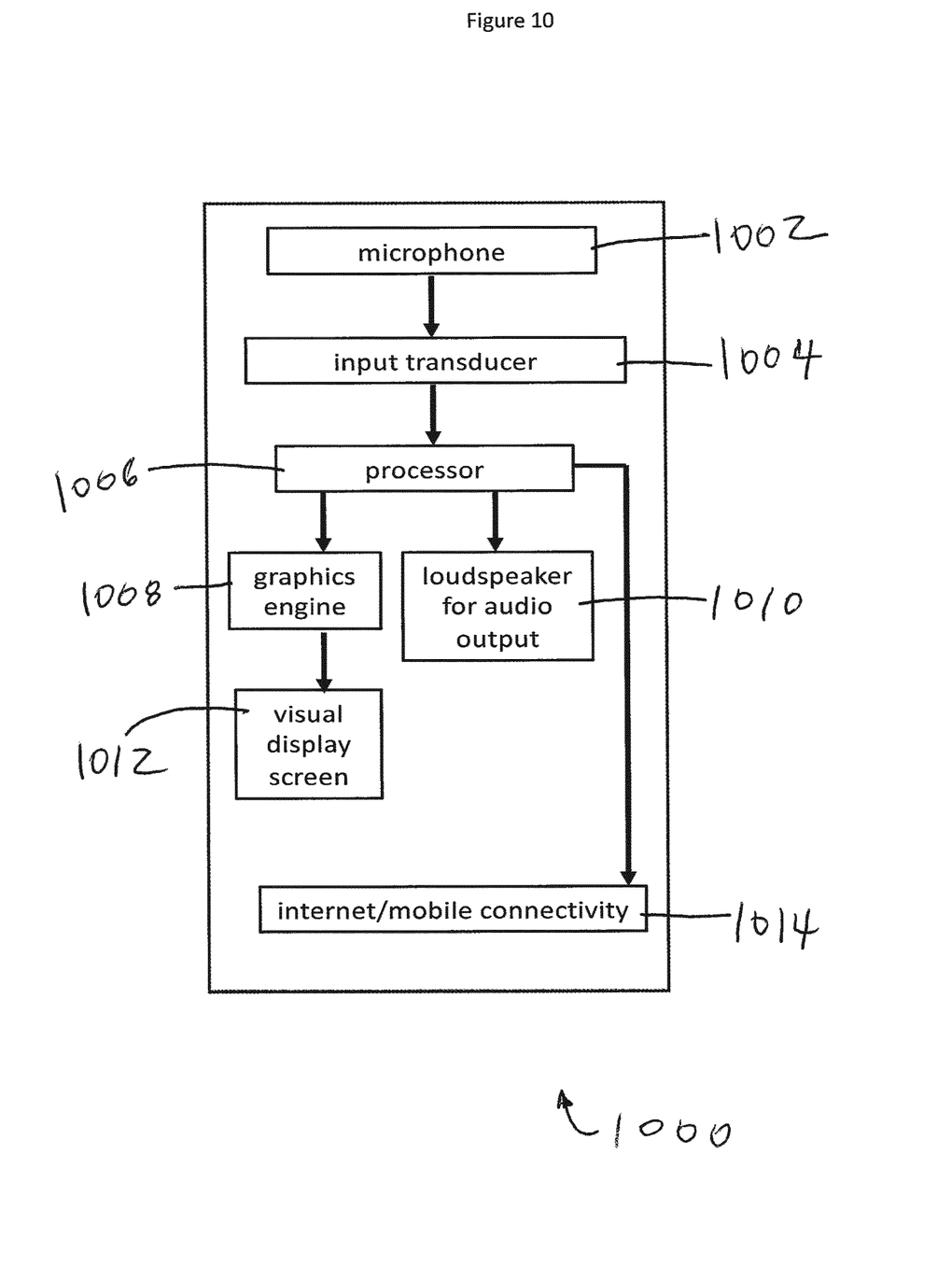
FIG. 10 is a block diagram of a computational system for implementing certain embodiments of the invention.

FIG. 10 is a block diagram of a computational system 1000 for implementing embodiments of the invention. In FIG. 10, the computational system 1000 is illustrated with components for performing the processing operations described in this document. The components may be contained within a handheld computing device or a tablet computer or a smart phone or the like, or may be distributed across multiple devices. That is, the computational system 1000 may be a singular, handheld device that incorporates all of the components illustrated in FIG. 10, or selected components of the illustrated computational system may be distributed among two or more devices, in accordance with the configuration of the computational system, as desired. For example, the components of the system 1000 may be distributed among a worn device, such as a wrist computer or watch, and a companion device that communicates with the other distributed components.

In FIG. 10, the computational system 1000 includes a microphone 1002 that receives spoken input. The microphone typically produces an analog output voltage in response to the received spoken input. Other forms of microphone output may also be suitable, if the microphone produces a data representation of the received spoken input. The signal produced by the microphone 1002 is received at an input transducer 1004, which prepares the microphone signal for computer processing. The input transducer may comprise, for example, an analog to digital converter, or may incorporate other processing that will prepare the microphone output for computer operations. The output of the input transducer 1004 is received at a processor 1006 for operations in accordance with the invention disclosed herein.

The processor 1006 produces data that is provided to a graphics engine 1008 and a loudspeaker 1010. The output of the processor 1006 comprises output, such as digital data, that is suitable for processing by the other components of the computational system 1000, such as the graphics engine 1008 and the loudspeaker 1010. The graphics engine 1008 provides output to a visual display screen 1012. The visual display screen may comprise the display of a handheld device that contains one or more of the components in the computational system 1000, or the visual display screen may comprise the display of a single complete device that contains all of the components in the computational system 1000, or the visual display screen may comprise a display of a device separate from the other components of the system 1000, such that the output from the graphics engine 1008 is received in the separate device and is provided to the visual display screen 1012. In a distributed configuration of the system such as a system with a separate display device, the display device may comprise a component of a worn device such as a wrist watch, or may comprise a smart phone display, or a tablet computer display, or other computational devices associated with the components of the system 1000. The processor 1006 also provides data for a mobile connectivity component 1014, such as via "WiFi" connection or "Bluetooth" connection or the like. The connectivity component 1014 may include an Internet connection or other mobile communications system connection.

The operation of quantizing the received audio signal (that is, quantization of the signal) may occur anywhere in the system 1000 as desired, but the typical configuration of the system will perform quantization in the input transducer 1004 or in the processor 1006. The quantization operation comprises digitizing the received signal into time slices, such that the input signal, which is in analog form when spoken, is converted into a digital representation having numerical values representing the input signal at intervals specified by the time slices. For ease of processing, the time slices are selected in accordance with a regular repeating uniform time interval. The duration of the time interval is typically selected to be not greater than one-half the time interval of the shortest duration time for the shortest anticipated phoneme in the language of interest. Greater fidelity of the quantized signal may be obtained with shorter duration time slices. Greater fidelity relates to increased detail and greater accuracy of the quantized signal as compared with the original acoustic input analog signal. For example, if the shortest anticipated phoneme is approximately 0.4 second, then the time slice intervals for the quantization operation would be no greater than 0.2 second. Greater fidelity could be obtained with a shorter time slice, such as a time interval of less than 0.2 second.

It is not necessary for the time slice interval to be a function of the anticipated phoneme duration in a language of interest. As noted, greater fidelity of the quantized signal could be obtained with a shorter time slice, and therefore the time slice may be selected with an arbitrarily shorter duration time interval, in the interest of greater fidelity of the quantized acoustic input signal. For example, if the shortest anticipated phoneme is approximately 0.4 second, the time slice intervals for the quantization operation could be selected to be 0.05 second in duration, for greater fidelity of the quantization. In the case of a 0.05 second time slice, the analog acoustic input signal would be quantized by generating a digital numerical value corresponding to a feature of the acoustic input signal at every 0.05 second of the acoustic input signal. As noted above, in the disclosed system, acoustic components of the input signal correspond to the components comprising amplitude, rhythm, and pitch frequency of the input signal.

A variety of techniques known to those skilled in the art may be used to extract the desired acoustic components from the acoustic input signal. For example, a frequency detector such as a detector using a Fast Fourier Transform may be used with the input signal to generate numerical values at the time slice intervals such that the numerical values represent the pitch frequency of the input signal. Those skilled in the art will understand how to obtain suitable detectors for each of the desired acoustic input signal components. As described herein, the desired acoustic input signal components correspond to the components comprising amplitude, rhythm, and pitch frequency of the acoustic input signal. Therefore, the processing within the system 1000 will include detectors that produce quantized components of the acoustic input signal comprising amplitude, rhythm, and pitch frequency of the acoustic input signal. The processing operations for the quantization of the acoustic input signal may be performed by computer software programming executed by the system 1000, typically computer software programming executed in the input transducer 1004 or in the processor 1006. Therefore, no hardware detector is illustrated in the block diagram of FIG. 10. If desired, however, the signal component detectors may be implemented as hardware detector blocks, either any one of the detectors, or any combination of one or two or three of the component detectors being hardware blocks integrated into the system 1000.

Individual scores for each parameter may be calculated, for example, as follows. The metric associated with the quantization of every time point of user input is divided by the metric associated with the quantization of every time point of reference line to obtain a time point by time point score, which is a match percentage score. This time point percentage match is then summed over the entire duration of the audio input to obtain an overall score for that parameter. The composite score may be calculated as the average of the scores of each parameter, such as the following:

Composite=(Loudness score+Rhythm score+Pitch score)/3.

Figure 11:
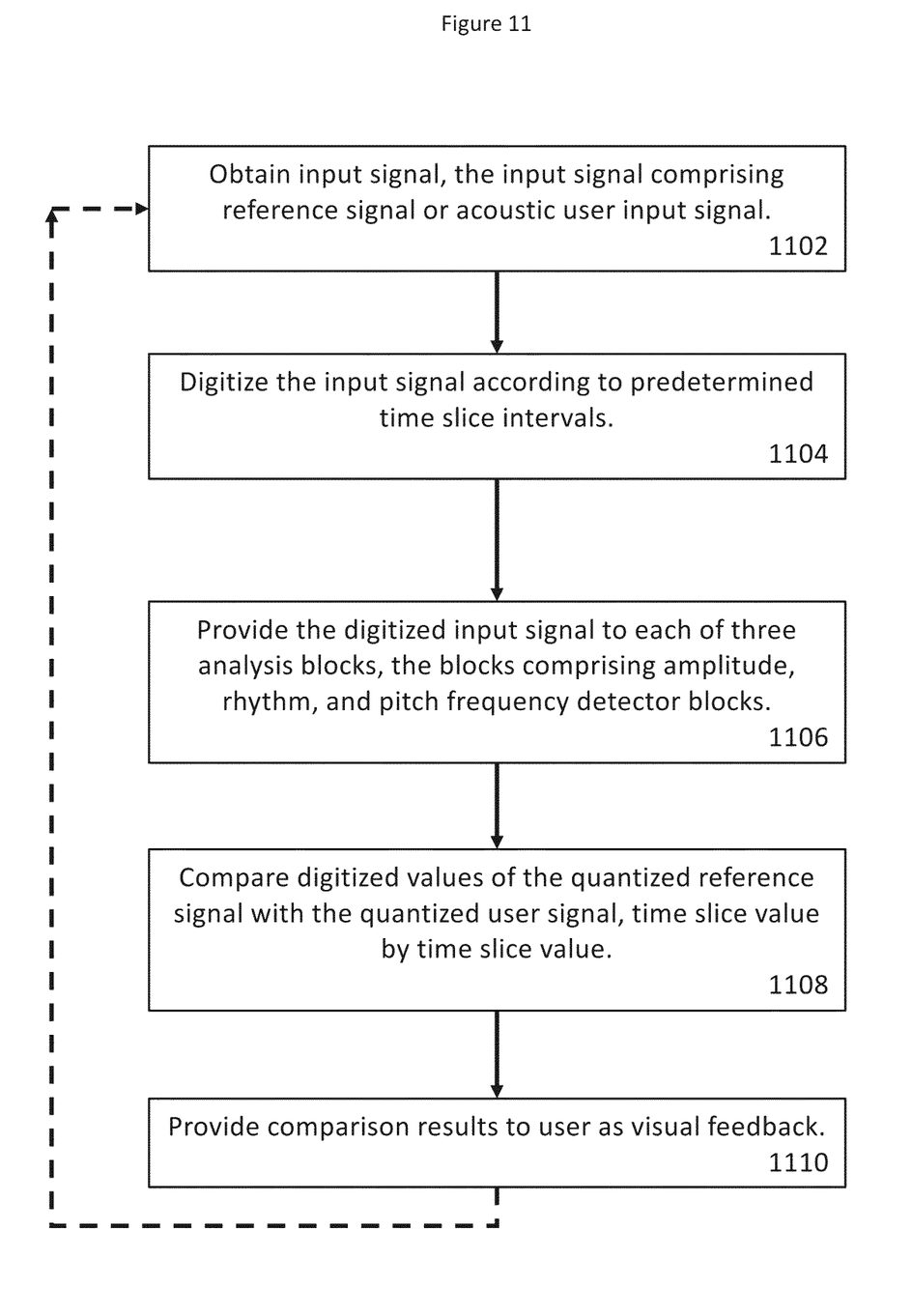
FIG. 11 is a flow diagram that illustrates the operations performed by the computational system in operation according to the description herein.

FIG. 11 is a flow diagram that illustrates the operations performed by the computational system in operation according to the description herein. In the first flow diagram operation, indicated as the box 1102, the computational system obtains the input signal, which may be a spoken version of a reference phrase, or may be an initial verbalization attempt of the phrase by a user, or may be any subsequent verbalization attempt by a user. In FIG. 11, the dashed lines connecting the box 1110 back to the box 1102 is meant to indicate that the feedback process for using the system in its intended manner is a repetitive process, so that a user may iteratively repeat attempts at verbalization of phrases, both with repeated verbalizations of the same reference phrase, and with repeated attempts of different reference phrases. For purposes of FIG. 11, either of these phrases (reference phrase, user verbalization of a phrase) may comprise the input signal.

At the FIG. 11 flow diagram box numbered 1104, the obtained input signal is digitized according to the predetermined time slice intervals. As described above, the time slice intervals can be a variety of time duration periods, typically not greater than one-half the duration of the shortest anticipated phoneme interval in the language of interest. In the next flow diagram operation, in the box numbered 1106, the digitized input signal is provided to each of three analysis blocks. In the disclosed system, as noted above, the analysis blocks may comprise amplitude, rhythm, and pitch frequency detector blocks. Additional detector blocks for other speech components of interest may be provided, as well. These detector blocks may be separate and independent operating blocks, or they may all be contained within the same operating block or section of software programming. After the operation to detect acoustic language components comprising amplitude, rhythm, and pitch frequency at box 1106, the digitized values of the quantized reference signal are compared with the quantized user signal, or a quantized prior user verbalization may be compared with a quantized subsequent user verbalization. The comparison takes place according to the quantized numerical data; that is, the quantized data corresponding to the respective signals at each respective time slice interval are compared to each other, at the box numbered 1108. This operation takes place in real time, so that the comparison outcome at each time slice interval is known, as each time slice interval occurs. In this way, the user may be provided with real-time feedback as to the result of the comparison. Such real-time feedback is indicated at the box numbered 1110. The processing loop may begin anew, if desired, with a next input signal, as indicated by the dashed line extending from the box 1110 to the box 1102.

The present invention has been described above in terms of presently preferred embodiments so that an understanding of the present invention can be conveyed. There are, however, many configurations for electronic devices not specifically described herein but with which the present invention is applicable. The present invention should therefore not be seen as limited to the particular embodiments described herein, but rather, it should be understood that the present invention has wide applicability with respect to electronic devices generally. All modifications, variations, or equivalent arrangements and implementations that are within the scope of the attached claims should therefore be considered within the scope of the invention.

We claim:
1. A method of processing spoken speech, the method comprising:
   processing a reference acoustic input into a representation of numerical values such that the representation of numerical values comprises a collection of numerical values that represent acoustic components determined from the reference acoustic input, wherein the acoustic components comprise volume, rhythm, and pitch frequency of the reference acoustic input;
   generating a visual representation that simultaneously depicts the acoustic components comprising volume, rhythm, and pitch frequency of the reference acoustic input;
   receiving a first user acoustic input;
   processing the first user acoustic input into a representation of numerical values such that the quantization representation comprises acoustic components determined from the user acoustic input, wherein the acoustic components comprise volume, rhythm, and pitch frequency of the user acoustic input;
   generating a visual representation that simultaneously depicts the acoustic components comprising volume, rhythm, and pitch frequency of the first user acoustic input;
   determining a difference between the representation of numerical values of the reference acoustic input and the representation of numerical values of the first user acoustic input;
   generating a representation of the determined difference;
   calculating a score of the first user acoustic input with respect to each of the three acoustic components;
   calculating a composite score that is an average of the three scores of the three acoustic components of the reference acoustic input and the three acoustic components of the first user acoustic input.

2. A method as in claim 1, wherein the acoustic components of the processed reference acoustic input comprise numerical values that are determined independently of each other from the reference acoustic input.

3. A method as in claim 2, wherein the reference acoustic input is received in real time and the acoustic components comprising amplitude volume, rhythm, and pitch frequency of the reference acoustic input are determined in real time.

4. A method as in claim 3, wherein the visual representation of the acoustic components is generated in real time.

5. A method as in claim 1, wherein the visual representation of the acoustic components is configured for presentation on a display screen of a portable device.

6. A method as in claim 1, further including:
   displaying the visual representation of the reference acoustic input and the visual representation of the first user acoustic input on a display screen of a portable device.

7. A method as in claim 6, wherein the method is performed by components contained within a worn computational system device.

8. A method as in claim 6, wherein the method is performed by components contained within a portable computational system device.

9. A method as in claim 6, wherein the method is performed by components including a microphone, processor, graphics engine, loudspeaker, and connectivity component that are contained within a portable computational system device.

10. A method as in claim 1, further comprising:
    receiving a subsequent user acoustic input at a time subsequent to receiving the first user acoustic input;
    determining a difference between the quantization representation of the reference acoustic input and the quantization representation of the subsequent user acoustic input;
    generating a representation of the determined difference.

11. A method as in claim 1, further comprising:
    receiving a subsequent user acoustic input at a time subsequent to receiving the first user acoustic input;
    determining a difference between the quantization representation of the first user acoustic input and the quantization representation of the subsequent user acoustic input;
    generating a representation of the determined difference.

12. A device comprising:
    a microphone that receives a reference acoustic input and produces digital data representing the reference acoustic input;
    a processor that performs operations for processing the digital data that represents the reference acoustic input into a quantization representation such that the quantization representation comprises acoustic components determined from the reference acoustic input, wherein the acoustic components comprise volume, rhythm, and pitch frequency of the reference acoustic input;

the operations performed by the processor further comprising:
receiving a first user acoustic input;
processing the first user acoustic input into a quantization representation such that the quantization representation comprises acoustic components determined from the user acoustic input, wherein the acoustic components comprise volume, rhythm, and pitch frequency of the user acoustic input;
generating a visual representation that simultaneously depicts the acoustic components comprising volume, rhythm, and pitch frequency of the first user acoustic input;
a graphics engine that generates a visual representation that simultaneously depicts the acoustic components comprising volume, rhythm, and pitch frequency of the reference acoustic input;
the operations performed by the processor further including:
determining a difference between the quantization representation of the reference acoustic input and the quantization representation of the first user acoustic input;
generating a representation of the determined difference;
the operations performed by the processor further comprising:
calculating a score of the first user acoustic input with respect to each of the three acoustic components;
calculating a composite score that is an average of the three scores of the three acoustic components of the reference acoustic input and the three acoustic components of the first user acoustic input.

13. A device as in claim 12, wherein the acoustic components of the processed reference acoustic input comprise numerical values that are determined independently of each other from the reference acoustic input.

14. A device as in claim 12, wherein the reference acoustic input is received in real time and the acoustic components comprising volume, rhythm, and pitch frequency of the reference acoustic input are determined in real time.

15. A device as in claim 14, wherein the visual representation of the acoustic components is generated substantially in real time.

16. A device as in claim 12, wherein the visual representation of the acoustic components is configured for presentation on a display screen of a portable device.

17. A device as in claim 12, the operations performed by the processor further including:
displaying the visual representation of the reference acoustic input and the visual representation of the first user acoustic input on a display screen of a portable device.

18. A device as in claim 12, the operations performed by the processor further comprising:
receiving a subsequent user acoustic input at a time subsequent to receiving the first user acoustic input;
determining a difference between the quantization representation of the reference acoustic input and the quantization representation of the subsequent user acoustic input;
generating a representation of the determined difference.

19. A device as in claim 12, the operations performed by the processor further comprising:
receiving a subsequent user acoustic input at a time subsequent to receiving the first user acoustic input;
determining a difference between the quantization representation of the first user acoustic input and the quantization representation of the subsequent user acoustic input;
generating a representation of the determined difference.

20. A device as in claim 12, wherein the visual representation of the acoustic components is configured for presentation on a display screen of a portable device.

* * * * *